May 5, 1964   B. LEGLER   3,131,426
APPARATUS FOR CURING FOAMED MATERIALS
Filed April 25, 1961

INVENTORS.
Bobby Legler

BY
ATTORNEY

United States Patent Office 3,131,426
Patented May 5, 1964

3,131,426
APPARATUS FOR CURING FOAMED MATERIALS
Bobby Legler, Lake Jackson, Tex., assignor to The Dow Chemical Company, Midland, Mich., a corporation of Delaware
Filed Apr. 25, 1961, Ser. No. 105,308
2 Claims. (Cl. 18—5)

The present invention relates to curing flexible elastomeric cellular materials and is more particularly concerned with a novel apparatus for rapidly curing flexible elastomeric open celled materials, as for example, polyurethane foams.

Present day commercial practice usually heat-cures flexible cellular materials for from 2 to 10 or more hours at temperatures from about 70° to 150° C. In those few instances where time and storage area were not critical these cellular materials have been cured at room temperature. This latter method of curing usually requires several days time and necessarily large areas where the foamed materials can be stored without stacking. It is well known that the cure is an important factor in determining the final physical properties, e.g., compression set and the like, of the cured cellular materials. Further, in large scale production, rapid cure, reducing the time cycle, or materially reducing the necessity of a large outlay in space, drying ovens, inventory, etc. would be desirable. It is an advantage of the present process that the time for curing the cellular materials is less than approximately one sixtieth of that previously thought necessary to obtain the optimum physical properties, and that the space and equipment to carry out the present process is likewise substantially reduced in size and expense.

Figure 1:
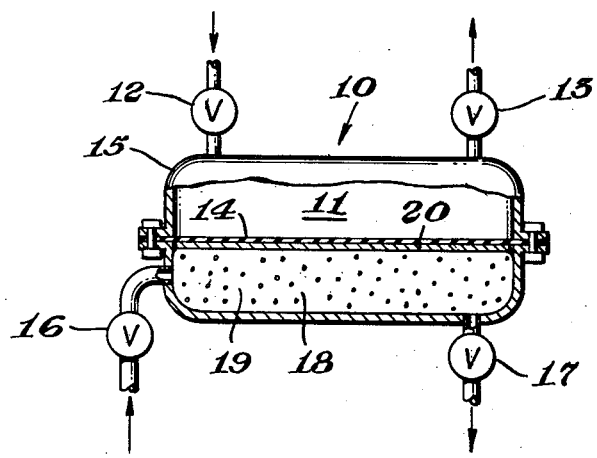
Figure 2:
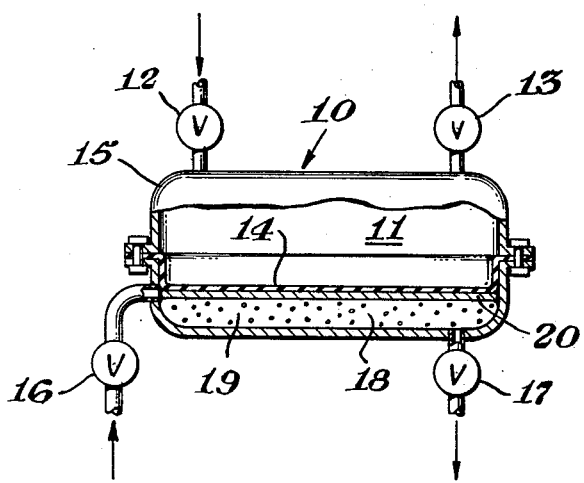

It is an object of the present invention to provide an apparatus for rapidly curing flexible elastomeric open celled materials. These and other objects will become apparent to those skilled in the art from the following description of the present invention and the accompanying drawings; in which:

FIGURES 1 and 2 show in partial section in elevation an embodiment of an apparatus comprising a mold-like chamber for curing open celled materials in two different phases of operation in accordance with the teaching herein.

It has now been found that flexible elastomeric cellular materials having a predominantly open-cell structure can be cured in from 2 seconds to 10 minutes by injecting steam into their interior. The introduction of the steam can be accomplished in the manners illustrated in the drawings, as for example, as shown in FIGURES 1 and 2 introducing steam into the interior of a foam which has been compressed to expel the gas and to crush any closed cells. The steam is introduced at a temperature of from about 100° C. to about 150° C. at atmospheric or superatmospheric pressure If the foam is dense, the steam and any condensate which forms can be withdrawn by subjecting the so steamed foam to a vacuum. This is accomplished merely by opening the mold form through an exhaust line to a vacuum. Good results have been obtained when the steam is at a temperature of from about 100° to 150° C. and the steam at these temperatures is maintained in the foam for from about 2 seconds to about 10 minutes. It is to be understood that the introduction of steam can be continuous or intermittent and that the evacuation of condensate may follow each steam injection.

In accordance with the present invention, any flexible elastomeric cellular material requiring heat-curing can be cured in from 2 seconds to 10 minutes. For example, for illustrative purposes only and ease of presentation, a polyurethane foam is prepared by first preparing a prepolymer from an active-hydrogen-containing polymeric material of suitable molecular weight and hydroxyl number and a controlled amount of diisocyanate. The reaction between these materials is permitted to continue until substantially all of the exothermic heat of reaction has been generated and dissipated. Thereafter additional polyisocyanate and water are added to provide for gas generation. Upon completion of foaming the foam is crushed to open the cells and expel air and gases from the interior and subjected to steam-curing by injecting steam into the interior of the foamed mass. The introduction of steam is continued, usually from 2 seconds to 10 minutes. Injection of the steam into the foamed mass can be by several injections of from 1 second to several minutes or continuously for from 2 seconds to about 10 minutes. Upon completion of the steam injection, the cured foam, if desired, can be subjected to evacuation to remove the steam and/or water which may have condensed and facilitate drying of the foam. The steaming and evacuating may constitute a single cycle i.e., steaming for from 2 seconds to 10 minutes, then evacuating for a like period or several cycles, i.e., intermittently steaming and evacuating, until the total steaming consumes from 2 seconds to 10 minutes with evacuation for a like period or slightly longer period to remove the steam, air and condensates.

In the apparatus illustrated in FIGURES 1 and 2 a mold-like apparatus 10 is provided having an air chest 11, air chest pressurizing valve 12 and air chest exhaust valve 13, a flexible diaphragm 14 in the upper portion 15 defining the lower extent of the air chest 11, a cavity steam valve 16 and cavity exhaust valve 17 are connected with the lower mold cavity 18. In operation, a shaped foamed article 19 is placed in the mold cavity 18, the mold closed and chest air pressurizing valve 12 opened. Chest exhaust valve 13 and cavity steam valve 16 are closed and cavity exhaust 17 is opened. The diaphragm 14 moves downward, crushing the foam. Then chest exhaust valve 13 and cavity steam valve 16 are opened and chest air valve 12 and cavity exhaust valve 17 closed. Steam enters the mold cavity, fills the cells of foam 19 and moves the diaphragm 14 upward, the air in chest 11 exhausts through valve 13. Upon return of the diaphragm 14 to its original position, cavity exhaust valve 17 is opened permitting steam to exhaust from the mold cavity 18 thereby to continue application of heat and to remove any condensate which may have formed. Alternatively, the mold cavity 18 can be fitted with a crusher plate 20, which moves with the diaphragm 14 in the crushing step and which can be pneumatically or hydraulically held against the foam while the diaphragm 14 is returned by steam being admitted to the article portion of the chamber. This operation permits more rapid introduction of steam into the foam and assures expulsion of the air and gases from the foam. The crusher plate may be used in several steaming and expulsion cycles rather than moving the diaphragm.

I claim:

1. An apparatus comprising: a pair of shell-like members adapted to open and close upon each other, a flexible expandable impervious diaphragm fixedly mounted within one of said shell-like members in a position so that when the shell-like members are in closed position the said diaphragm separates the interior into two fluid-tight chambers, means associated with each of said so defined chambers to provide motivating fluid to said chambers; means associated with each of said chambers to exhaust said motivating fluid from said chambers.

2. An apparatus comprising: a pair of shell-like members adapted to open and close upon each other, a flexible expandable impervious diaphragm fixedly mounted within one of said shell-like members in a position so that when the shell-like members are in closed position the said diaphragm separates the interior into two fluid tight chambers, means associated with each of said chambers to provide motivating fluid to said chambers; means associated with each of said chambers to exhaust said motivating fluid from said chambers and a perforate plate positioned within one of said chambers in moveable engagement with said diaphragm.

References Cited in the file of this patent

UNITED STATES PATENTS

| | | |
|---|---|---|
| 892,702 | Wyman | July 7, 1908 |
| 1,209,308 | Lanhoffer | Dec. 19, 1916 |
| 1,863,854 | Jeffery | June 21, 1932 |
| 2,362,672 | Sloan | Nov. 14, 1944 |
| 2,363,107 | Young | Nov. 21, 1944 |
| 2,367,779 | Hull | Jan. 23, 1945 |
| 2,385,083 | Kemerer | Sept. 18, 1945 |
| 2,392,180 | Vidal et al. | Jan. 1, 1946 |
| 2,528,643 | Dubbs | Nov. 7, 1950 |
| 2,882,566 | Redhead | Apr. 21, 1959 |
| 3,056,183 | Pigeot | Oct. 2, 1962 |

FOREIGN PATENTS

| | | |
|---|---|---|
| 501,641 | Great Britain | Feb. 28, 1939 |